(12) United States Patent
Bala et al.

(10) Patent No.: US 8,576,418 B2
(45) Date of Patent: Nov. 5, 2013

(54) METHOD FOR DYNAMIC OPTIMIZATION OF REFINEMENT PATCHES FOR COLOR PRINTER CHARACTERIZATION

(75) Inventors: Raja Bala, Webster, NY (US); Yonghui Zhao, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 360 days.

(21) Appl. No.: 12/965,959

(22) Filed: Dec. 13, 2010

(65) Prior Publication Data

US 2012/0147391 A1    Jun. 14, 2012

(51) Int. Cl.
*G06F 15/00* (2006.01)
*H04N 1/00* (2006.01)
*H04N 1/36* (2006.01)

(52) U.S. Cl.
USPC .......................... 358/1.13; 358/409; 358/411

(58) Field of Classification Search
USPC ......... 358/1.9, 3.23, 515, 518, 523, 530, 409, 358/410, 411, 412
See application file for complete search history.

(56) References Cited

U.S. PATENT DOCUMENTS

| | | | |
|---|---|---|---|
| 2002/0031258 A1* | 3/2002 | Namikata | 382/165 |
| 2004/0114165 A1* | 6/2004 | Nakajima | 358/1.9 |
| 2007/0247678 A1* | 10/2007 | Takahashi et al. | 358/515 |
| 2011/0102821 A1* | 5/2011 | Baba | 358/1.9 |

FOREIGN PATENT DOCUMENTS

JP     2006168027    *   6/2006 ............... B41J 2/525

OTHER PUBLICATIONS

Bala, R.; Chapter 5 Device Characterization, Digital Color Imaging Handbook; CRC Press, 2003; Sharma, Gaurav, editor; pp. 1-92 plus Tables and Figures (145 pages total).
Balasubramanian, Raja; Optimization of the Spectral Neugebauer Model for Printer Characterization, Journal of Electronic Imaging, vol. 8(2), p. 156-166, 1999.
Chen, Yongda; Berns, Roy S; Taplin, Lawrence A.; Six color printer characterization using an optimized cellular Yule-Nielsen Spectral Neugebauer Model, Journal of Imaging Science and Technology, vol. 48 (6), p. 519-528, 2004.
Balasubramanian, Raja; Maltz, Martin S.; Refinement of Printer Transformation Using Weighted Regression, SPIE vol. 2658, p. 334-340, 1996.

* cited by examiner

*Primary Examiner* — Jerome Grant, II
(74) *Attorney, Agent, or Firm* — Michael J. Nickerson; Basch & Nickerson LLP (57) ABSTRACT

A method generates a set of color patches that can be used to characterize a color printer. An accurate reference printer model is selected. A base set of calibration patches is printed and measured. The measurements are used to generate a model that can be used to predict the color produced by the reference printer for any combination of its colorants. The base set of patches is supplemented by a set of patches chosen to reduce the maximum color error produced by using the model compared to the predictions of a reference printer model. The supplemented set of patches is used to generate a more accurate model of the printer. The supplemented set of patches is used to recalibrate other instances of the printer.

19 Claims, 5 Drawing Sheets

METHOD FOR DYNAMIC OPTIMIZATION OF REFINEMENT PATCHES FOR COLOR PRINTER CHARACTERIZATION

BACKGROUND

Color printers are in common use in the business world today. One of the important characteristics of a color printer is the ability to accurately reproduce colors specified in a user document for colors within the printer gamut. In order to provide this accurate reproduction of color the printer must be characterized.

Color printer characterization derives the conversion between the input signals to the printer, or device values, and the color measurements of the resulting printed colors or color values. Accurate printer characterization generally involves numerous measurements of printed color samples.

In one approach, a basic printer model is derived using a minimal number of patches e.g. solid overprints and single-colorant ramps, and refined with additional patches. Printer characteristics often slightly drift over a period of time, thus requiring re-characterization; and hence many more measurements.

Therefore, it would be desirable to provide a method of characterizing a color printer that reduced the amount of measurement required to recharacterize the printer.

BRIEF DESCRIPTION OF THE DRAWING

The drawings are only for purposes of illustrating various embodiments and are not to be construed as limiting, wherein.

DETAILED DESCRIPTION

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

Color printer characterization is the process that builds the components that control the conversion between the input signals to the printer, that are the device values, and the color measurements of the resulting printed colors, that is the color values. Device values are also known as colorant combinations.

A forward printer characterization or simply printer characterization is referred to as a method of converting from device values to color values, while an inverse printer characterization converts color values to the device values required to produce that specific color. Inverse characterization is controlled by the accuracy of the forward printer characterization. Thus, it is critical to obtain the accurate forward printer characterization, which is the goal of this invention. Commonly both forward and inverse transformations are usually implemented as a multidimensional look-up-table (LUT) for computational speed.

The forward printer characterization can be derived either by empirical approaches, by the use of physics-based models, or by a hybrid combination of these two approaches, where, for example, a physics-based model is empirically refined with additional measurement data.

The forward characterization is often implemented as an n-dimensional lookup table that converts between the n-colorants of device space and the output color space. Similarly, the inverse characterization is implemented as a multi-dimensional lookup table that converts between output color space and the device space. The exact number of dimensions in each case is determined by the specific color space on one hand and by the number of device colorants on the other hand.

Characterization of a printer in an operating environment is necessary because printer characteristics commonly change over time and in response to environmental factors such as temperature or humidity.

In the empirical approach, a large number of color patches, each patch corresponding to a specific combination of device colorants is printed and measured. These measured values can be used to generate a lookup table. The accuracy of the resulting forward characterization is limited in great part by the number of patches used to generate the lookup table.

For example, a CMYK printer could use a lattice of 13 steps in each of the colorants. This requires a total of $13^4$ patches, which is equal to 28561 patches. While it is possible to generate and measure the very large number of patches needed to allow for high accuracy of the color output of the printer for a single printer in a development environment, the burden of the large number of measurements makes such a process undesirable in an operating environment.

Thus, there is a tradeoff between the size and distribution of the sample set and the resulting accuracy.

An alternative approach to characterization of a printer is to use an analytical model to predict the output color that corresponds to any combination of device values. Analytical models are commonly based on a physical model of the printing and viewing processes. Analytical models have an advantage over empirical models in that they commonly contain a small number of adjustable parameters. The small number of parameters can be defined by a much smaller number of printed patches than does an empirical model.

An example of an analytical model is the Yule-Nielson Neugebauer (YNN) model.

The YNN model is characterized by the equation:

$$R = \left( \sum_{i=1}^{16} w_i R_{i,primary}^{1/n} \right)^n$$

Where R is the spectral reflectance of a printed patch comprising a combination of the primary colorant; the $R_{primary}$ are the spectral reflectance of each of the primary colorants, and the w are a set of weights. The parameters of this model can be obtained for a given printer by printing and measuring the reflectance spectra for a small number of patches. The YNN model essentially performs multi-dimensional linear interpolation over the $R^{1/n}$ space. Since interpolation accuracy can be improved by reducing the interpolation area, subspaces or cells are created to improve the performance, referred as cellular YNN model (CYNN).

The CYNN model improves on the basic YNN model by dividing the color space into a number of cells and then calculating a set of YNN parameters for each cell. This requires adding a set of ramps of the colorants and combinations of colorants to the basic overprint set needed for the YNN model. The number of steps in the ramps is an adjustable parameter. If smaller cells are desired to improve accuracy, the number of steps in the ramps is increased.

In the hybrid approach, the characterization lookup table can be generated by a combination of the empirical and model-based approaches. The lookup table is first built using the model-based approach. The model is then refined by adding measured samples in the regions of the color space where the model does not perform well. That is, the refinement samples should be chosen with a denser sampling in the regions where the physical model tends to be erroneous. These additional measurements might be combined with the basic model measurements by a technique such as weighted linear regression.

In the description that follows, for the sake of clarity, the characterization process is described in terms of building a multi-dimensional lookup table. Other ways of characterizing a printer are known to those skilled in the art.

Figure 1:
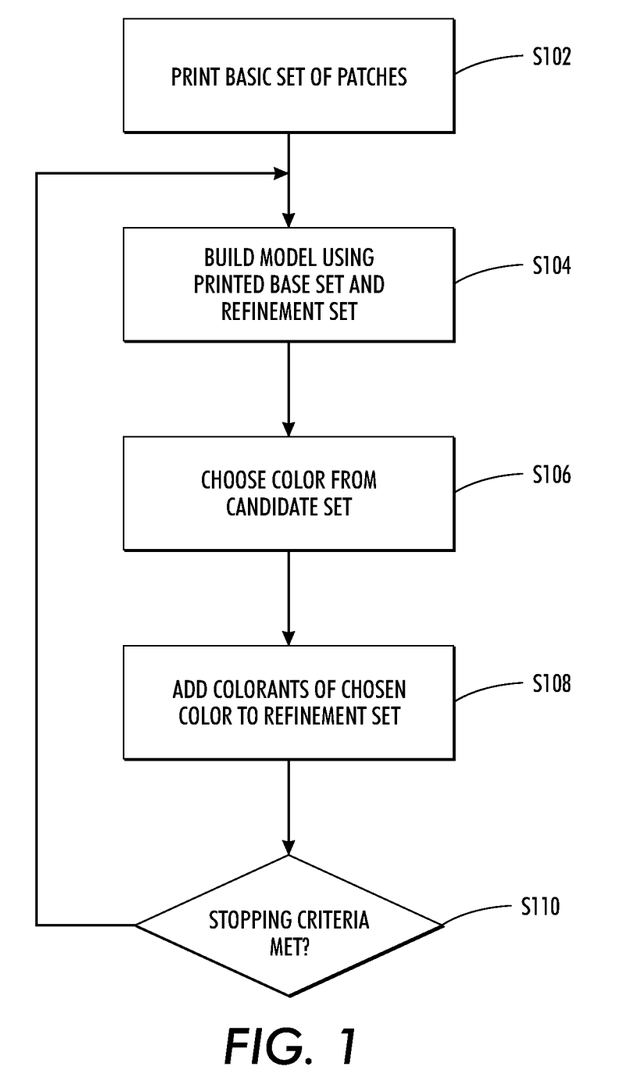
FIG. 1 illustrates in flowchart form a method for selecting a set of color patches for color printer characterization.

FIG. 1 shows a flowchart of a method that adds refinement samples in those regions of the color space where the physical model is least accurate. The method illustrated in FIG. 1 selects colors from a candidate set to the refinement set in order to characterize a color printer. The selected colors in the refinement set correspond to the regions where the physical model tends to be erroneous and are used to refine the physical model.

While printers using four colorants, namely CMYK, are the most common form of color printers, the process being described can work for any number of colorants.

The forward model thus generated can then be used to generate the inverse model lookup table, namely one that contains the colorant combinations corresponding to any color in the printer gamut.

Figure 5:
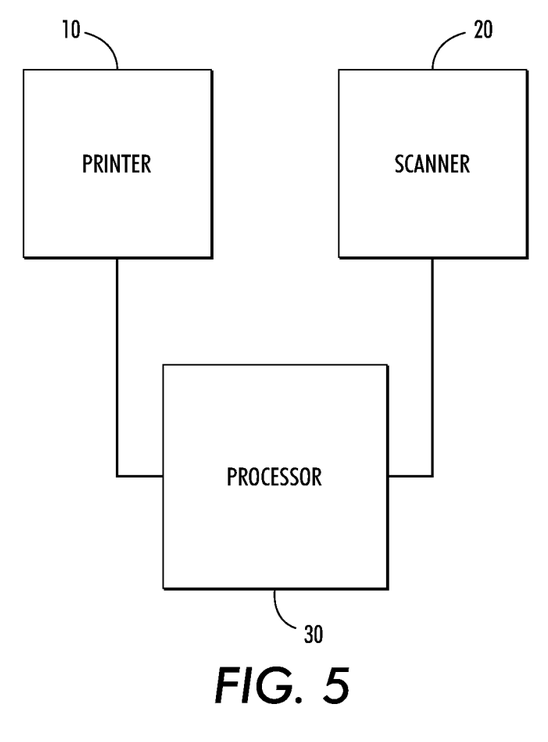
FIG. 5 illustrates a system for enabling the selection of a set of color patches for color printer characterization.

As illustrated in FIG. 1, in step S102, a base set of patches are printed (by printer 10, as illustrated in FIG. 5) and measured (by scanner or scanning device 20, as illustrated in FIG. 5). The measured color values and the known colorant combinations can be used to determine (by processor 30, as illustrated in FIG. 5) the parameters of a model such as the CYNN model described above. It is common to include more patches than the minimum needed to define the pre-selected refinement set; this allows for a least squares or similar fitting process to improve the overall accuracy of the model's predictions.

For example, when the model chosen is a CYNN model, the basic set would include just overprints and ramps to characterize the CYNN model. The extra color patches in the refinement set can be used to refine the model in the region of the color space where the model does not perform well.

In step S104, a lookup table or other instantiation of the basic printer model is built (by processor 30, as illustrated in FIG. 5) using the printed base set and refinement set to predict the color generated by a combination of colorants. Such a lookup table would contain a number of nodes. The number of nodes in the lookup table is determined by the need for accuracy in printing.

In step S106 a color not in the base set is chosen (by processor 30, as illustrated in FIG. 5) from a larger set of potential candidate colors. These candidate colors can be determined by a variety of procedures. For example, the candidate colors might be chosen by comparing the color difference of all the nodes in the lookup table predicted by the basic printer model and a predetermined reference printer model. The predetermined model might be a more comprehensive analytical model, or it might be developed by an exhaustive printing of all or most of the possible colorant combinations.

Alternatively, the candidate colors might be chosen from a set of colors that are particularly important to the users of the printing process. Some example of such colors includes specific colors for corporate logos, or a range of colors found in natural scenes such as foliage or flowers.

In step S108, the colorant combination selected, in step S106 is added (by processor 30, as illustrated in FIG. 5) to the refinement set of color patches used to refine the basic printer model.

In step S110, a check is made (by processor 30, as illustrated in FIG. 5) to see if a termination state has been reached. This termination state might include stopping when a predetermined number of patches have been added to the refinement set. Alternatively, the termination state might be reached when the largest color difference between the basic printer model and a reference printer model is below some predetermined threshold.

When the termination state is not reached, the process continues, in step S104, where the model is updated using any color patches that have been added to the refinement set.

Figure 2:
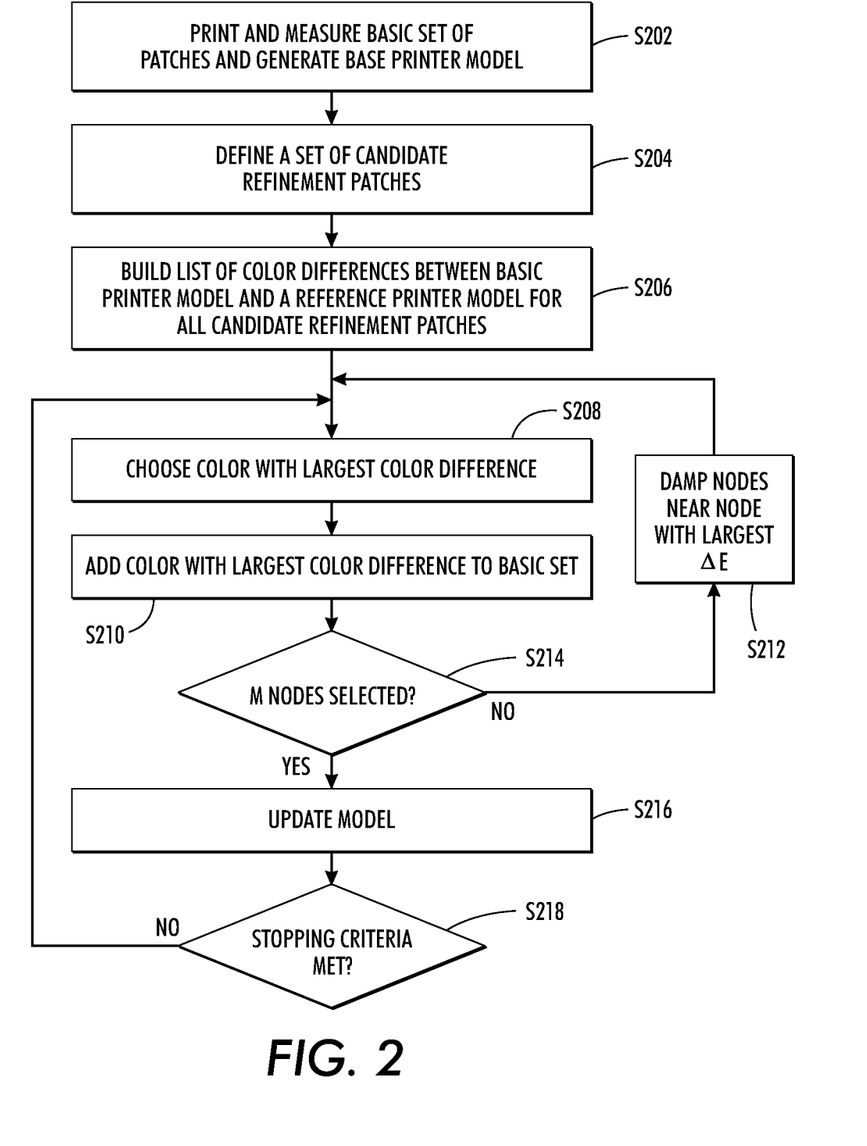
FIG. 2 illustrates in flowchart form a method for selecting a set of color patches for color printer characterization with a damping function used in the selection process of FIG. 1.

An exemplary embodiment of the method of FIG. 1 is shown in FIG. 2. In this example, refinement patches are added in groups, where the size of the group is a predetermined number, herein referred to as "M." Thus, at each step, M patches are selected instead of just 1.

The method of FIG. 2 proceeds in a similar fashion as the method of FIG. 1. In step S202, the base set of patches is printed (by printer 10, as illustrated in FIG. 5) and a basic printer model is built (by processor 30, as illustrated in FIG. 5) using the measured values of these patches.

In step S204, a set of candidate colors that will be used to select a set of refinement patches is defined (by processor 30, as illustrated in FIG. 5). The set might include essentially all of the colors defined on a three-dimensional set of nodes that cover the color space of the printer. Alternatively the set of candidate patches might include specific colors that are of particular interest; for example flesh tones.

In step S206, a list of the color difference of the candidate set of colors predicted by a basic printer mode and a previously defined reference printer model is generated (by processor 30, as illustrated in FIG. 5). The reference model can be based on a more elaborate analytical model. Alternatively, the reference model might be based on an exhaustive printing of a large number of colorant combinations, for example the $13^4$ described previously.

The list of color differences can be used to identify those colors where the basic printer model is least accurate. By adding these colors to the refinement set, the performance of the basic printer model can be improved. The inclusion of the colors with a large color difference between the basic printer model and the reference printer model will update the basic printer model where the updated basic printer model takes into account the colors where the original model was deficient.

In step S208, the color with the largest color difference is selected (by processor 30, as illustrated in FIG. 5) from the list prepared in step S206. This color and its colorant combination is added (by processor 30, as illustrated in FIG. 5) to the refinement set of patches in step S210, thus expanding the refinement set to include the extra colorant combination that generates the largest color difference. By doing so, extra emphasis is given to the newly added color when developing the printer model, thus reducing the error associated with that color. The basic printer model will be updated later (by processor 30, as illustrated in FIG. 5), in step S216, to include the effects of the new color. By updating the model only after M colors have been added the computational burden is reduced. An alternative would be to update the model after each patch is added to the refinement set.

For the particular exemplary embodiment shown in FIG. 2, the process adds colorants in groups of M colors at a time, where M is some previously chosen value. The basic printer model is updated once after a group of M selected colors, instead of updated M times after each selected color. By adding the colors in groups, the amount of computation needed to update the basic printer model is reduced. Therefore, in step S214, a check is made (by processor 30, as illustrated in FIG. 5) to see if the number of patches added in this iteration of the process has reached the limit, M, previously set. If the limit has not been reached, control passes to step S212.

In step S212, colors near the color, selected in step S208, are damped (by processor 30, as illustrated in FIG. 5). This damping is needed because the colors close to the last selected color are likely to also have large color differences. However because they are close to the color that at this stage has the largest color difference, they are likely to have lower color differences when the printer model is updated. Hence by damping the nearby colors, colors that are further away may be selected to refine the basic printer model across a broader region of the color space.

Thus, in step S212, a damping function is applied to the list of color difference values, calculated in step S206, where the colors near to the previously selected color will be affected more by the damping function. The damping function will reduce the color differences of colors near the previously selected color more than it will reduce the color differences for colors further away.

For example the color differences between the basic and reference LUTs for all the nodes might be modified by multiplication with a damping function $f(d)$ of the distance d (in color space) from the selected color. The damping function $f(d)$ has the property $f(0)=0$, and gradually increases to 1 with increasing d. This way, the color difference for the color, selected in step S208, turns to zero; and color differences for the colors far away from the selected node remain unaltered.

Figure 3:
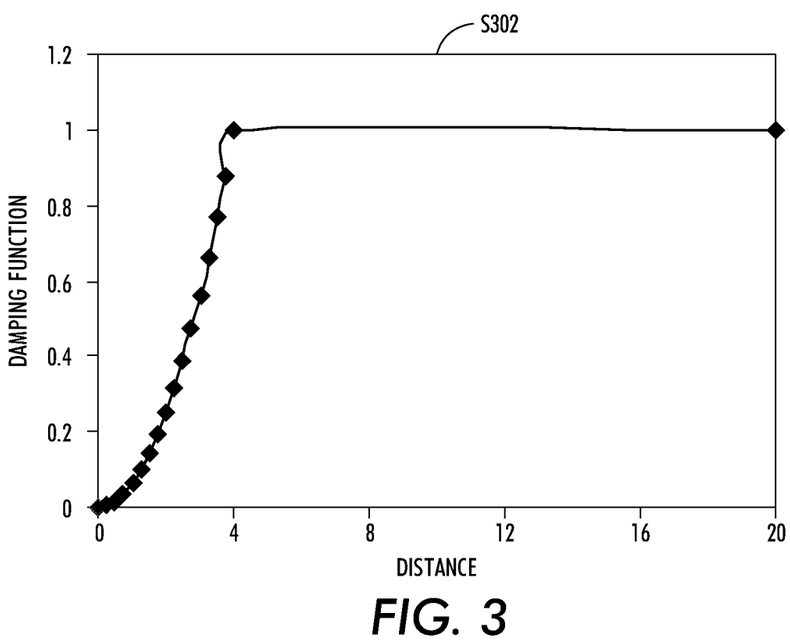
FIG. 3 illustrates the damping function used to adjust the color difference values within a predetermined color difference from the selected color.

FIG. 3 shows an example of such a damping function. This function can be described by the equations:

$$f(d) = \begin{cases} (d/4)^2 & d \le 4 \\ 1 & \text{otherwise} \end{cases}$$

Processing now continues back at step S208. The color with the largest color difference after any previously selected color, after damping the colors in its neighborhood, is selected and the selection of colors continues until M colors are selected.

After M patches have been added, the process proceeds to step S216 where the basic printer model is updated (by processor 30, as illustrated in FIG. 5) using the newly selected patches in the refinement set together with the base set of patches.

After the model is updated, a check is made (by processor 30, as illustrated in FIG. 5), in step S218, to see if a previously defined stopping criterion has been met. Such a stopping criterion might be to check to see a previously specified number of patches have been added to the basic set. Alternatively the stopping criterion might be to stop when the last selected color difference in step S208 is below a previously defined threshold value.

Figure 4:
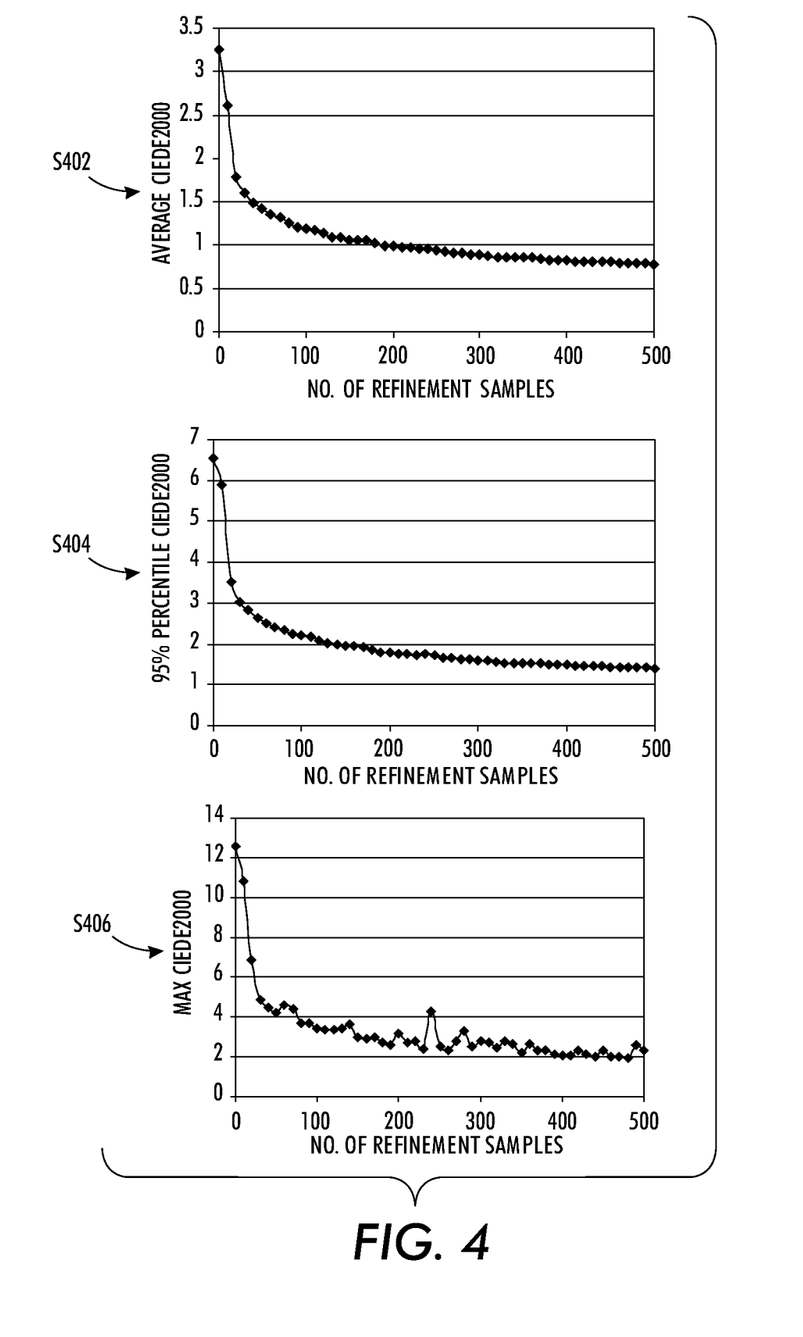
FIG. 4 illustrates the improvement in color accuracy when applying the process of FIG. 2 to an exemplary CMYK printer.

FIG. 4 shows an example of the results of applying the process of FIG. 2 to an exemplary CMYK printer. In the example shown in FIG. 4, the predetermined reference model used in step S206 was generated by exhaustive sampling of the colorant space. A grid of 13×13×13×13 nodes was chosen and the corresponding patches were printed and measured. The basic printer model was a CYNN model where the basic set of patches included the 16 primaries (all combination of 100% overprints) and 84 single color ramp patches (21 steps in each of the four primary colorants). The average, 95% percentile and maximum color differences of all the nodes between the basic and reference printer models are computed for the increasing number of patches included in the refinement set.

In graph 402, the average color difference CIEDE2000 is shown plotted against the number of refinement patches. Graph 404 shows the 95% color difference, and graph 406 shows the maximum color difference. It is expected that the printer artifacts, e.g., page-to-page variation and spatial non-uniformity over a single page, can cause about 1 unit of average color difference error and about 2 units of maximum color difference error.

The graphs of FIG. 4 show that the color error decreases rapidly with an increase in the number of refinement patches and that only about 150 to 200 refinement patches are needed to bring the color differences down to the level limited by the measurement uncertainty caused by the printer artifacts. This number of patches is to be compared to the number needed for a full empirical model. For a grid size of 10 units along each axis, the grid would require the printing and measuring of 10,000 patches.

The set of refinement patches generated by applying the method of either FIG. 1 or FIG. 2 can be used to refine the basic printer model built based only on the base set of patches. The base set of patches and the set of refinement patches generated by applying the method can be used to recalibrate the printer when the printer characteristics change due to aging or environmental changes. Furthermore, the set of refinement patches can be used to recalibrate other, similar models of the printer.

As described above, a method for selecting a set of color patches for color printer characterization may include printing and measuring a base set of color patches, each patch defining a combination of printer colorants; building a basic printer model using the measured color values of the printed base set of color patches; selecting a color from a candidate set of colors; adding the selected color to a refinement set; defining the basic printer model using the refinement set and the base set; and repeating the process of selecting a color, adding the selected color to the refinement set, refining the basic printer model until a termination criterion is satisfied.

The method may include having the selected color have the largest color difference between the color values predicted by a predefined reference printer model and the basic printer model.

The method may include selecting a second color, the second selected color being the one with the next largest color difference predicted by a predefined reference printer model and the basic printer model to the refinement set.

The method may include adjusting the color difference of the candidate set of colors within a predetermined color distance, in some color space, from the first selected color, before selecting another color, wherein the adjustment comprises reducing the color difference using a damping function.

The method may include having the termination criterion be reaching a predetermined number of colors in the refinement set.

The method may include the termination criterion being when the maximum color difference between the reference printer model and the basic printer model is below a predetermined threshold.

The method may include having a printer model be represented as a multi-dimensional color look-up table, where the multi-dimensional color look-up table predicts the color for any combination of printer colorants.

The method may include having the base set of color patches include single color ramps and solid overprints.

The method may include having the large candidate set of colors include all the nodes in the multi-dimensional look-up-table of a predetermined reference printer model.

The method may include having the large candidate set of colors comprises a set of user-specified colors of interest.

The method may include having the basic set of color patches and the final refinement set of color patches be printed and used to characterize other instances of the printer.

Furthermore, as described above, a method for calibrating a color printer has been disclosed may include printing and measuring a base set of color patches, each patch comprising a predetermined combination of printer colorants; building a basic printer model, using the measured color value of each patch of the printed base set of color patches, the model predicting the color produced by any combination of printer colorants; generating a list of color differences between the colors predicted by a predetermined reference printer model and the colors predicted by the basic printer model; selecting a colorant combination corresponding to the color with a largest color difference between the colors predicted by a predetermined reference printer model and the colors predicted by the basic printer model; and refining the basic printer model using the selected colorant combination.

The method may further include selecting a second colorant combination where the second colorant combination corresponds to the color with a next largest color difference from the list of color differences and refining the basic printer model using the second selected colorant combination.

The method may further include modifying the color difference values of colors that are within a predetermined distance of the color with the largest color difference prior to selecting a next largest color difference.

The method may include having the color difference values be modified using a damping function.

The method may include repeating the selection of the next largest color difference until the selected color difference is less than a predetermined threshold.

The method may include repeating the selection of the next largest color difference until a predetermined number of patches has been reached.

The method may further include having the basic printer model or the predetermined reference model be represented as a multi-dimensional color look-up table, where the table predicts the color for any combination of printer colorants.

In addition, as described above, a method for generating a set of color patches for characterization of a color production process has been disclosed, may include printing a base set of color patches, each patch defining a combination of colorants used in the color production process; building a basic color model, the basic color model predicting the color generated by a given set of colorants, using measured color values of the printed base set of color patches; selecting a color that has a largest color difference between the color values predicted by a predefined reference color model and the color values predicted by the basic color model; adding the selected color to a refinement set; refining the basic color model using the refinement set and the base set; and repeating, until a predefined termination criterion is satisfied, the process of selecting colors, adding colors to the refinement set, and refining the basic color model with the refinement set and the base set.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for selecting a set of color patches for color printer characterization comprising:
    printing and measuring a base set of color patches, each patch defining a combination of printer colorants;
    building a basic printer model using the measured color values of the printed base set of color patches;
    selecting a color from a candidate set of colors, the selected color having a largest color difference between the color values predicted by a predefined reference printer model and the basic printer model;
    adding the selected color to a refinement set of color patches;
    refining the basic printer model using the refinement set of color patches and the base set of color patches; and
    repeating, until a termination criterion is satisfied, selecting a color, adding the selected color to the refinement set, and refining the basic printer model using the refinement set of color patches and the base set of color patches.

2. The method as claimed in claim 1, further comprising:
    selecting a second color, the second selected color being a color with a next largest color difference between color values predicted by the predefined reference printer model and the basic printer model.

3. The method as claimed in claim 2, further comprising:
    adjusting a color difference of the candidate set of colors within a predetermined color distance from the first selected color, before selecting another color, wherein the adjustment reduces the color difference using a damping function.

4. The method as claimed in claim 1, wherein the termination criterion is reaching a predetermined number of colors in the refinement set.

5. The method as claimed in claim 1, wherein the termination criterion is when a maximum color difference between the reference printer model and the basic printer model is less than a predetermined threshold.

6. The method as claimed in claim 1, wherein a printer model is represented as multi-dimensional color look-up table, where the multi-dimensional color look-up table predicts a color for any combination of printer colorants.

7. The method as claimed in claim 1, wherein the base set of color patches includes single-color ramps and solid overprints.

8. The method as claimed in claim 1, wherein the candidate set of colors includes all the nodes in the multi-dimensional look-up-table of a predetermined reference printer model.

9. The method as claimed in claim 1, wherein the candidate set of colors includes a set of user-specified colors of interest.

10. The method as claimed in claim 1, wherein the basic set of color patches and the refinement set of color patches are printed and used to characterize other instances of the printer.

11. A method for calibrating a color printer comprising:
   printing and measuring a base set of color patches, each patch comprising a predetermined combination of printer colorants;
   building a basic printer model, using the measured color value of each patch of the printed base set of color patches, the basic printer model predicting the color produced by any combination of printer colorants;
   generating a list of color differences between colors predicted by a predetermined reference printer model and colors predicted by the basic printer model;
   selecting a colorant combination corresponding to a color with a largest color difference between the colors predicted by a predetermined reference printer model and the colors predicted by the basic printer model; and
   refining the basic printer model using the selected colorant combination.

12. The method as claimed in claim 11, further comprising:
   selecting a second colorant combination, the second colorant combination corresponding to the color with a next largest color difference from the list of color differences; and
   refining the basic printer model using the second selected colorant combination.

13. The method as claimed in claim 12, further comprising:
   modifying the color difference values of colors, within a predetermined distance of the color with the largest color difference, prior to selecting a next largest color difference.

14. The method as claimed in claim 13, wherein the color difference values are modified using a damping function.

15. The method as claimed in claim 12, further comprising:
   repeating the selection of the next largest color difference until the selected color difference is less than a predetermined threshold.

16. The method as claimed in claim 12, comprising repeating the selection of the next largest color difference until a predetermined number of patches has been reached.

17. The method as claimed in claim 11, wherein the basic printer model is represented as a multi-dimensional color look-up table, the multi-dimensional color look-up table predicting the color for any combination of printer colorants.

18. The method as claimed in claim 11, wherein the predetermined reference model is represented as a multi-dimensional color look-up table, the multi-dimensional color look-up table predicting the color for any combination of printer colorants.

19. A method for generating a set of color patches for characterization of a color production process comprising:
   printing a base set of color patches, each patch defining a combination of colorants used in the color production process;
   building a basic color model, using measured color values of the printed base set of color patches, the basic color model predicting a color generated by a given set of colorants;
   selecting a color that has a largest color difference between color values predicted by a predefined reference color model and color values predicted by the basic color model;
   adding the selected color to a refinement set of color patches;
   refining the basic color model using the refinement set of color patches and the base set of color patches; and
   repeating, until a predefined termination criterion is satisfied, selecting colors, adding colors to the refinement set of color patches, and refining the basic color model with the refinement set of color patches and the base set of color patches.

* * * * *